United States Patent
Grove

[15] 3,668,445
[45] June 6, 1972

[54] ELECTROMAGNET FOR BRAKES AND CLUTCHES

[72] Inventor: Leroy K. Grove, South Bend, Ind.
[22] Filed: Dec. 21, 1970
[21] Appl. No.: 99,896

[52] U.S. Cl. ..................310/77, 188/138, 188/251 A, 192/18 B, 310/44
[51] Int. Cl. .....................................H02k 7/102
[58] Field of Search .............310/77, 76, 78, 44; 188/138, 188/251 A; 192/18 B

[56] References Cited

UNITED STATES PATENTS

| | | | |
|---|---|---|---|
| 3,037,586 | 6/1962 | Modersohn | 188/138 |
| 3,255,512 | 6/1966 | Lochner et al. | 310/44 X |
| 2,834,895 | 5/1958 | Papst | 310/44 |
| 2,267,114 | 12/1941 | Lear et al. | 310/78 X |
| 2,580,869 | 1/1952 | Winther | 188/251 A |
| 2,304,118 | 12/1942 | Phain | 188/138 |
| 3,244,259 | 5/1966 | Brede et al. | 188/138 |

Primary Examiner—L. T. Hix
Assistant Examiner—B. A. Reynolds
Attorney—Hobbs & Green and Kemon, Palmer & Estabrook

[57] ABSTRACT

An electromagnet system having a friction material for engaging an armature, a pole and electrical coil for moving said friction material into engagement with said armature, the pole being constructed of a material which has magnetic characteristics and less wear resistance than the friction material so that the friction material normally forms the principal or only surface of contact between the electromagnet and the armature. The relationship of surfaces between the pole and the friction material may be obtained by the use of compacted, unfused powdered metal as the surface for the pole. The system is adaptable for use where the magnetic attraction of an electromagnet to an armature is employed as a linkage force for a braking function or direct frictional drive, and particularly for use in vehicle brakes and power transmission clutches and brakes.

19 Claims, 7 Drawing Figures

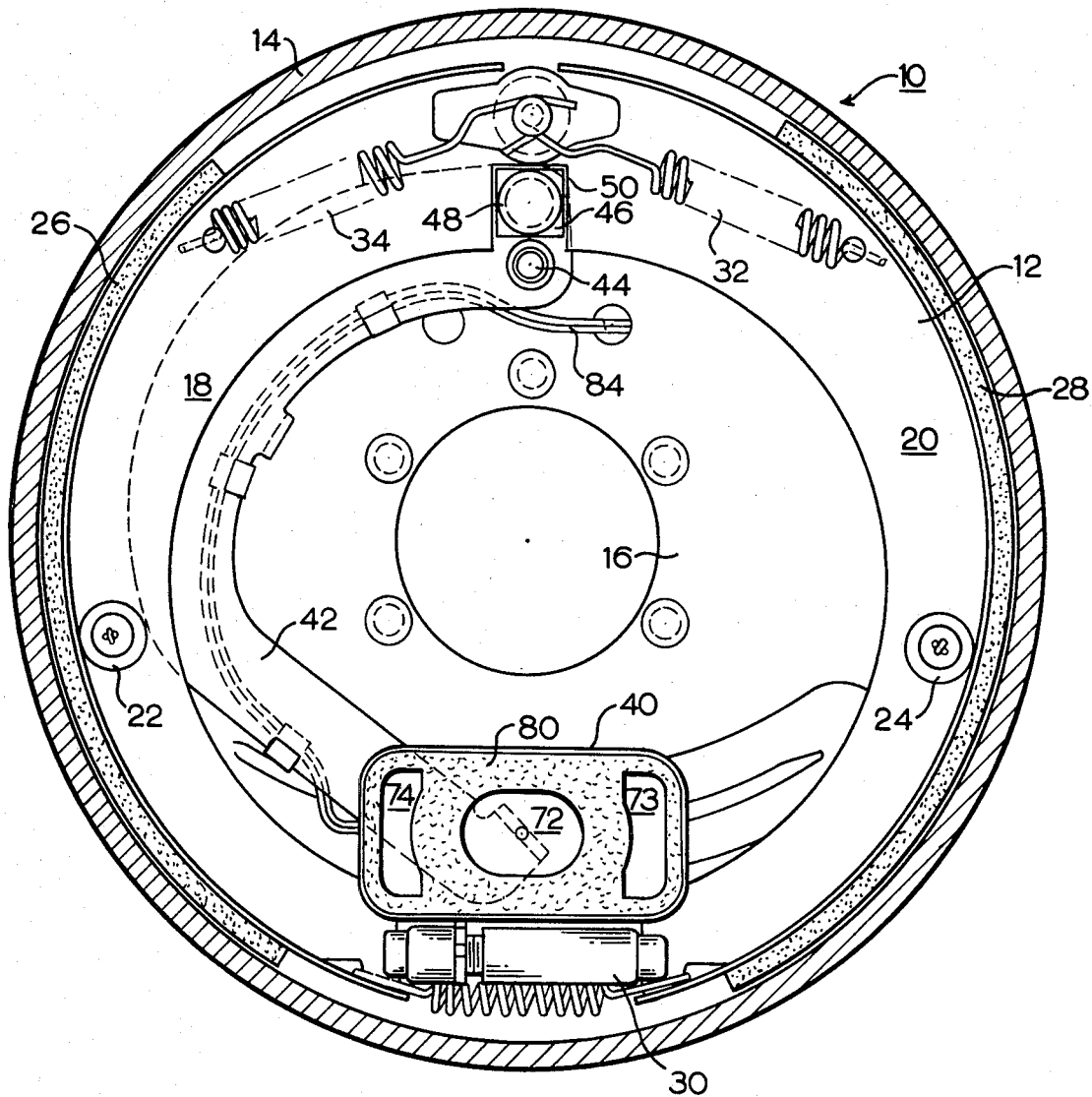
FIG. I
*INVENTOR.*
LEROY K. GROVE
BY Hobbs & Green
ATTORNEYS

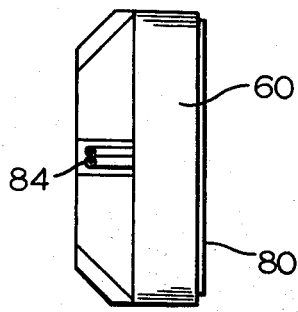
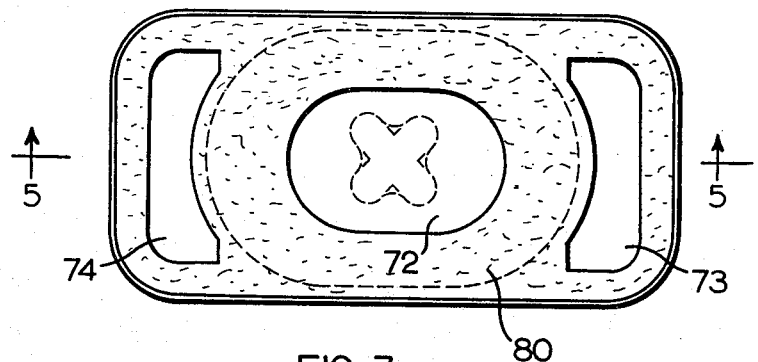
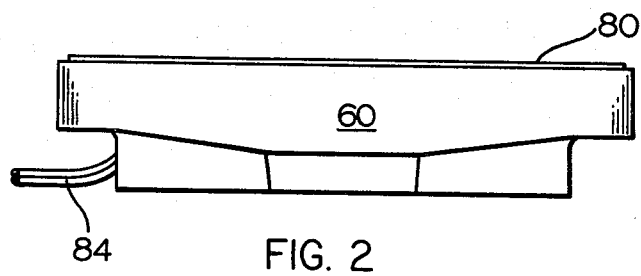
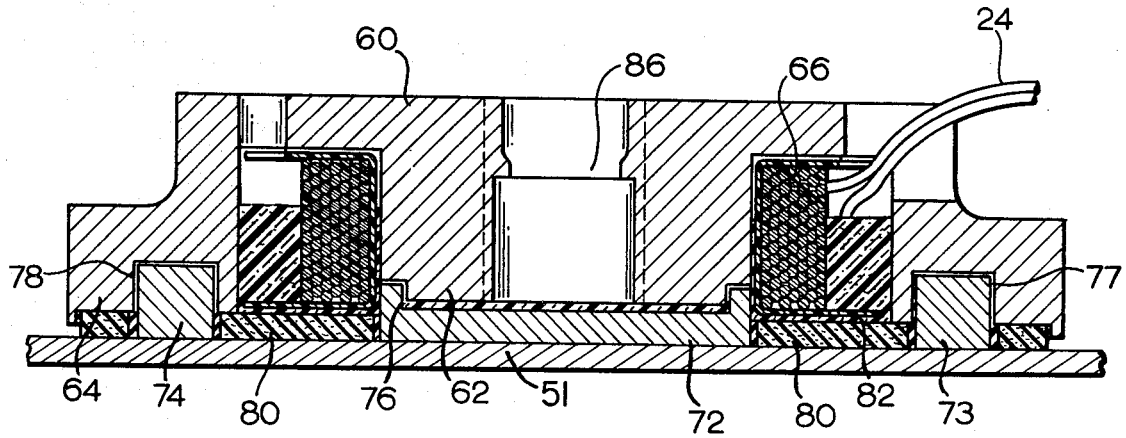
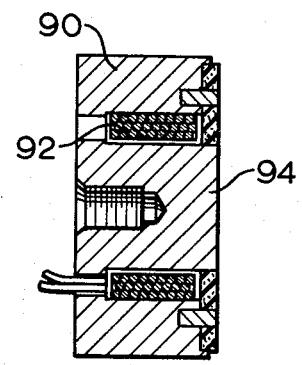
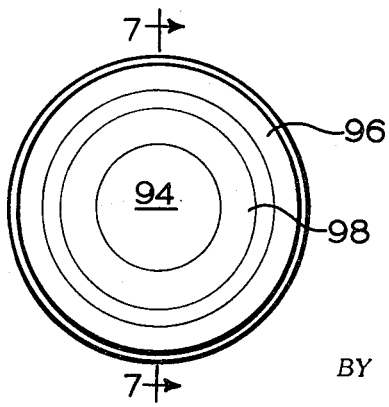

ELECTROMAGNET FOR BRAKES AND CLUTCHES

The present invention primarily involves a system for electrically actuating brakes and clutches, and the function and construction of an electromagnet for use in such a system. Such a system can be used in power transmission clutches and brakes, in vehicular electric brakes, or in any application where the magnetic attraction of an electromagnet to an armature is employed as the linkage force for a direct frictional drive or braking function. In all such applications it has been the practice to have the metal of the electromagnet provide both the linkage force and the direct frictional drive or braking function with direct metal-to-metal contact with an armature.

The invention primarily concerns an electromagnet of a fundamentally different construction whereby the function of the metal portion of the electromagnet is solely to provide the linkage force for a more efficient and longer lasting frictional drive or braking application without the many disadvantages of metal-to-metal frictional contact. While in no way limiting this invention to a single application the objects, features and advantages of this invention will become apparent as it is shown how this invention relates to a system of electrically actuated vehicular brakes and specifically to the construction of an electromagnet for use in such a system.

In conventional, hydraulically actuated brakes, a pair of brake shoes are pivotally secured to a stationary brake back-up plate and are caused to move into contact with a brake drum by the actuation of pistons in a hydraulic brake cylinder responsively to fluid pressure applied to the brake cylinder. In an electrically actuated system, the brake shoes are moved by an electromagnet through a lever arm pivotally secured to the brake back-up plate, such that rotation of the lever arm causes movement of the brake shoes into contact with the brake drum. The electromagnet is connected to the lever and, when operating, is maintained in sliding contact with an armature plate which is secured to and moves with the brake drum. In a one-piece cast iron drum and hub assembly, the face of the drum may serve as the armature plate. When the electromagnet is energized, it is magnetically attracted to the relatively moving armature plate, and due to the friction between these two metal parts so attracted, a force is imposed on the magnet tending to move it in the direction of movement of the armature. This force is in turn transmitted by the lever arm to actuate the brake shoes into braking engagement with a brake drum.

It has been the current practice to provide an electromagnet construction in which the metal poles of the electromagnet would, when energized, be forcibly held in direct metal-to-metal contact with the moving armature plate with sufficient magnetic attraction to provide necessary friction to actuate the brake shoes to the degree required. While the metal poles are often surrounded by a frictional material or plastic to improve the frictional characteristics, this measure is largely ineffective, in that the high heat and friction developed by the metal-to-metal friction soon cause galling, scoring and gouging of the electromagnet face and drum, which progressively increase in severity during continued use of the system. As the galling, scoring, and gouging of the electromagnet and armature plate progress, the effectiveness of the brakes regresses, at first by erratic and grabbing brake operation, followed by a reduction in magnetic attraction, less friction and less braking power as the surface contact area of the electromagnet and armature is decreased by the surface grooves. Finally complete failure occurs when the magnetic face is scored deeply enough to damage the electrical windings. In travel trailers and mobile homes, this can take place in a dangerously short time.

It is one of the principal objects of this invention to provide an electromagnet of a fundamentally new and improved construction whereby the function of the metal portion of the electromagnet is solely to provide the magnetic linkage force for a more efficient and longer lasting frictional face not involving metal-to-metal frictional contact.

Another object of the present invention is to provide an electromagnet for use primarily for brake and clutch applications, which provides quiet and smooth braking or clutching action over extended periods of time, and which also increases in braking and clutching performance and smoothness as it is used, even though the brake or clutch has frequent and repeated applications.

Still another object of the invention is to provide an electromagnet having a friction material for engaging another object in sliding contact such as a brake drum, clutch plate or rail, in which the friction material remains the principal contact surface as the adjacent face of the magnet wears, and in which the magnetic attraction between the magnet and the drum, plate or other object is maintained at optimum performance throughout the life of the equipment.

A further object of the invention is to provide a magnet for use in electric brakes and clutches in which the performance does not deteriorate or fade with wear of the engaging surfaces of the principal brake or clutch parts, either permanently or temporarily, and in which wear of the magnet face occurs substantially uniformly over the entire surface, thus giving and maintaining maximum surface contact between the magnet and the brake drum or clutch plate.

Another object is to provide an electric brake or clutch having an electromagnet with friction material thereon in combination with a disintegratable magnetic body which always maintains an operating surface on a plane with or recessed slightly inwardly from the operating contact surface of the friction material so that the friction material is always in effective contact with the operating surface of the brake drum or clutch plate and assists in maintaining the brake armature or clutch plate with a smooth surface for optimum performance throughout the life of the brake or clutch.

In one embodiment and application of the invention, the magnetic pole faces of the electromagnet are constructed of a finely powdered, unfused, densely compacted magnetic material used, at its magnetic face, in conjunction with a suitable frictional material. The finely powdered, unfused, densely compacted magnetic material of the pole faces has only negligible structural strength and is supported by plastic encapsulation on all surfaces except the face. Thus the magnetic pole faces with the friction material on a single flat face of the electromagnet are attracted, when the magnet is energized, to the armature plate of the moving wheel drum. The finely powdered, densely compacted magnetic material of the pole faces has, however, sufficient cohesion to carry the magnetic flux without crumbling, but when contacted by the armature plate, it reacts like a fine chalk and powders off in individual particles of powdered magnetic material. This maintains the magnetic pole faces of the electromagnet just barely out of frictional contact with the rotating armature plate while providing the magnetic linkage force to hold the friction material in tight frictional contact with the armature face, thus avoiding the possibility of metal-to-metal friction and scoring. The friction material operates in the same manner as the brake shoes on the outer drum and, in addition, greatly reduces contact pressure and heat, and, with this lower operating pressure and reduced heat, the friction material has a greatly increased life at optimum performance.

With no metal-to-metal contact, the friction material on the face of the electromagnet polishes the armature face during sliding contact, even when the electromagnet is not energized for braking. The frictional material has a coefficient of friction many times higher than metal and, therefore, requires much less electromagnetic linkage force or contact pressure to produce the frictional force required to actuate the brake shoes. Thus the electromagnet does not require as much electrical power to operate and, therefore, operates with a lower temperature rise or power loss, even when subjected to almost continuous application. Additionally, the frictional material of the electromagnet, operating against a smooth polished armature, gives an increased frictional reaction to provide a braking action which is smoothly responsive to the driver's electrical power input to the electromagnet.

Referring more specifically to the drawings:

FIG. 1 is a partial cross sectional and elevational view of an electric brake assembly, the section being taken through the brake drum;

FIG. 2 is a side elevational view of the electromagnet shown in FIG. 1;

FIG. 3 is a plan view of the face of the magnet as shown in the preceding figures;

FIG. 4 is an end elevational view of the magnet;

FIG. 5 is an enlarged cross sectional view of the magnet, the section being taken on line 5—5 of FIG. 3;

FIG. 6 is a plan view of the face of a modified form of an electromagnet embodying the present invention; and FIG. 7 is a cross sectional view of the magnet shown in FIG. 6, the section being taken on line 7—7 of the latter figure.

Referring more specifically to the drawings and FIG. 1 in particular, numeral 10 indicates generally the brake assembly, including a brake operating mechanism 12 and a brake drum 14 which is attached to and normally forms a part of the wheel structure of the vehicle in which the brake is used. The brake assembly includes a backing plate 16 on which brake shoes 18 and 20 are pivotally mounted, movably secured thereto or restrained by spring-loaded retaining pin assemblies 22 and 24, respectively. The brake shoes contain friction material 26 and 28 bonded to the external surface of the brake shoes, and engage the internal surface of drum 14 when the brake is applied. An adjustment screw 30 interconnects the brake shoes which are yieldably retained in their retracted position from the brake drum by springs 32 and 34.

The brake actuating mechanism for applying brake shoes 18 and 20 to braking engagement with the drum consists of an electromagnet 40, a lever 42 connected at one end to the magnet and pivotally mounted on a pin 44, which in turn is secured to backing plate 16. Lever 42 swings on pin 44 and is curved in an off-set manner to pass around the drum axis and to position the electromagnet at a point 180 degrees from pin 44. Arm 42 includes an extension or short arm 46 carrying a pin 48 on a swivel block 50, which bears against the adjacent ends of the brake shoes. The magnet is operated in conjunction with an armature 51 of conventional construction connected directly to brake drum 14, and is on a plane substantially parallel with backing plate 16. The magnet 40 faces the armature and is adapted to engage the face thereof when it is energized.

With the armature and the integrally formed brake drum 14 rotating in a counter clock-wise direction, electromagnet 40, when energized, will be moved to the right, thereby moving pin 48 to the left so that it pushes against the end of brake shoe 18 to move the shoe outwardly into braking engagement with the internal surface of drum 14. The engagement of the brake shoe 18 with the drum in turn develops a self energizing force on shoe 18, which is transmitted through screw 30 to brake shoe 20 to cause the latter shoe to move into braking engagement with the internal surface of drum 14. With the rotation of the armature plate and brake drum in the clock-wise direction, the action just described is performed in reverse with the electromagnet moving to the left to cause pin 48 to engage the adjacent end of the brake shoe 20 which in turn, through screw 30, actuates brake shoe 18. When the electromagnet is released or de-energized, the two springs 32 and 34 disengage the brake shoes from the drum, returning them and the electromagnet to the position illustrated in FIG. 1.

Electromagnet 40, which embodies the essence of the present invention, in the embodiment illustrated in FIGS. 2 through 5 consists of a ferrous metal body 60 having an inner pole 62 and outer pole 64 and electrical coil 66 disposed around inner pole 62. The face of the magnet contacting the armature is provided with a friction plate 80 and exposed wear inserts 72, 73 and 74, which are retained in electrical magnetic contact in slots or grooves 76, 77 and 78, respectively. The friction material, which is similar to that used on the brake shoes, generally surrounds inserts 72, 73 and 74, the inserts and the coil preferably being retained in their respective grooves or recesses by a potting compound generally indicated by numeral 82, so that the electromagnet becomes a firm, sturdy unit. The coil is connected to the control circuit for the brakes by lead wire 84, and the magnet is attached to lever 42 by a pin or tab joined to the respective end of the lever and extending into a central opening 86 in the magnet body 60.

The magnetic pole faces, formed by inserts 72, 73 and 74, consist of densely compacted, unfused, powdered magnetic material, the surface of which will disintegrate particle by particle, upon sliding contact with the ferrous metal armature of the brake or clutch. A suitable material for forming the magnetic inserts is a compressed, powdered ferrous metal of a presintering operation used in the formation of powdered metal articles. The finely powdered, loosely compacted magnetic material of the pole faces is formed to the desired shape in a die under tons of pressure per square inch, in powdered metallurgy terminology this being referred to as a green compact. The article thus formed has only sufficient structural strength to be handled, and is the first step in making powdered metal parts. Normally, green compacts are subsequently sintered under high temperature, to force the small metal particles together to obtain desired structural strength. The preferred method used herein does not include this sintering step or any other similar step which results in a fused body of material. The powdered metal is compressed under high pressure so that the particles adhere to one another, forming a uniform matrix of discrete particles which will separate from one another on the surface of the inserts as the inserts lightly contact the armature from time-to-time.

In a modified form, rather than using merely inserts 72, 73 and 74 for the surface contact with the armature, the entire body 60 may be formed of the compressed powdered metal. The nature of the compacted powdered metal is such that the surface of the powdered metal will wear slightly faster than the adjacent friction material on the surface of the electromagnet, thereby always permitting the friction material to assume firm contact with the surface of the ferrous armature, while permitting the magnetic flux to give optimum performance in attracting the magnet to the armature.

In the operation of the present magnetic structure, the electromagnet, when energized, is attracted to the armature plate, thereby firmly seating the friction material 80 on the surface of the armature plate with the surface of the compacted powdered metal being only slightly recessed by wear inwardly from the surface of the friction material. With the friction material of the magnet in engagement with the armature plate, arm 42 is actuated in the manner previously described herein to actuate brake shoes 18 and 20 to engage the inner surface of drum 14. The magnetic force required for operating the lever 42 is substantially reduced in that the friction material forms an effective frictional contact with the armature plate, thereby reducing the magnetic attraction required to operate the brake. As the brake is used, the electromagnet is maintained in optimum operating condition by the gradual removal of the powdered metal from the surface of the inserts, thus always exposing most effectively the contact surface of the friction material 80.

While the compacted powdered metal has been found effective as the material for forming the inserts or the complete body of the electromagnet, other relatively easily disintegrated materials having good magnetic flux conducting properties, may be used in place of the powdered metal, and the present invention envisions the broader concept in which the disintegratable or otherwise fact wearing material will perform the magnetic linkage function, while the friction material performs the frictional function with the armature plate. In view of the essentially exclusive contact of the friction material with the armature, the armature is maintained in smooth, effective operating condition for extended periods of time without any decrease in the frictional engagement characteristics of the magnet.

The embodiment of the invention illustrated in FIGS. 6 and 7, which is intended primarily for use in power transmission clutches and brakes, is essentially the same as that shown in the preceding figures, this embodiment including a body 90 having an inner pole and outer pole, and a coil 92. The entire magnet body as well as the face of the magnet is constructed of compacted metal or other suitable electromagnetic material similar to that illustrated at numerals 72, 73 and 74 in the preceding figures, and the friction material, illustrated generally by numerals 96 and 98, performs the same function as the friction material 80 described with reference to the preceding figures. The surface 94 of the compacted metal disintegrates upon contact with any metal armature, such as that in a brake or clutch, thus always remaining slightly recessed with respect to the surface of the friction material, but in sufficiently close proximity to the surface to operate effectively as a magnet to attract the armature.

While only two embodiments of the present electromagnet for brakes and clutches have been described in detail, various changes and modifications in structure and substitutions of materials may be made without departing from the scope of the invention.

I claim:

1. An electromagnet for use in electric brakes, clutches and the like having an armature movable relative to said magnet, comprising a body having a pole, an electrical coil for said pole, friction material on said body for engaging said armature when said coil is energized, and a surface on said pole being wearable on contact with said armature at a rate greater than said friction material for maintaining said friction material as the primary contact of the electromagnet with the armature.

2. An electromagnet as defined in claim 1 in which said surface on said pole consists of a compacted powdered metal having electromagnetic properties.

3. An electromagnet as defined in claim 2 in which said surface is on an insert forming a portion of said pole.

4. An electromagnet as defined in claim 3 in which said friction material consists of a pad secured to said body.

5. An electromagnet as defined in claim 2 in which said surface on said pole is on a plane substantially the same as the contact surface of said friction material but is normally slightly recessed with respect to said latter surface.

6. An electromagnet as defined in claim 1 in which said body and pole are constructed of compacted powdered metal having electromagnetic properties.

7. An electromagnet as defined in claim 1 in which said body has a plurality of poles, each with a surface thereon being disintegratable on contact with said armature, and friction material on said body having a contact surface on a plane substantially the same as the plane of said pole surfaces.

8. An electromagnet as defined in claim 1 in which said surface on said pole consists essentially of a compacted, unfused powdered metal having electromagnetic properties.

9. An electromagnet for use with a relatively movable part, comprising a body of friction material, a pole, an electrical coil for engaging said friction body and said relatively movable part when said coil is energized, said pole having a surface on substantially the same plane as the part engaging surface of said friction material and of less resistance to frictional wear than said friction material for maintaining said friction material as the primary contact of the electromagnet with the armature.

10. An electromagnet as defined in claim 9 in which said surface consists of compacted metal particles.

11. An electromagnet as defined in claim 10 in which said surface is on an insert forming a part of said pole.

12. An electromagnet as defined in claim 9 in which said pole and surface are joined integrally to one another and are of the same composition.

13. An electromagnet as defined in claim 9 in which said body is of a structure for operation with said movable part consisting of an armature forming an element of a brake.

14. An electromagnet as defined in claim 9 in which said body is of a structure for operation with a plate forming an element of a clutch.

15. An electromagnet as defined in claim 9 in which said surface on said pole consists essentially of a compacted, unfused powdered metal having electromagnetic properties.

16. An electromagnet for use in actuating electric brakes, clutches and the like, comprising a body of friction material having a surface for engaging a relatively movable element, a pole and an electrical coil for engaging said body of friction material and said relatively movable element, said pole being less wear resistant then said friction material and having a surface on substantially the same plane as that of the surface on said body but slightly recessed therefrom so that the surface on said pole contacts the surface on the relatively movable element with less pressure then said body of friction material.

17. An electromagnet as defined in claim 16 in which said surface on said pole consists essentially of a compacted, unfused powdered metal having electromagnetic properties.

18. In a structure for actuating electric brakes, clutches and the like using a member of friction material for engaging an armature: a magnet comprising an electrical coil for engaging said member and said armature, and a pole for said coil having a surface of less wear resistance than said friction material upon contact with said armature for maintaining said friction material as the primary contact of the electromagnet with the armature while simultaneously maintaining effective magnetic attraction between said pole and the armature when the magnet is energized.

19. A magnet as defined in claim 18 in which said material of said pole surface is composed of compacted, unfused, powdered metal.

* * * * *